United States Patent
Zhang et al.

(10) Patent No.: US 12,409,412 B1
(45) Date of Patent: Sep. 9, 2025

(54) CARBON CAPTURE SYSTEM APPLICABLE TO SOLID AMINE MATERIALS WITH VARIOUS PARTICLE SIZES

(71) Applicant: DeCarbon Technology (Shenzhen) Co., Ltd., Guangdong (CN)

(72) Inventors: Zuotai Zhang, Guangdong (CN); Feng Yan, Guangdong (CN); Xiaohua Jin, Guangdong (CN); Jiyun Xu, Guangdong (CN)

(73) Assignee: DeCarbon Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/093,573

(22) Filed: Mar. 28, 2025

(30) Foreign Application Priority Data

Jul. 9, 2024 (CN) .......................... 202410913354.9

(51) Int. Cl.
*B01D 53/02* (2006.01)
*B01D 53/04* (2006.01)
*B01D 53/62* (2006.01)

(52) U.S. Cl.
CPC ......... *B01D 53/62* (2013.01); *B01D 53/0438* (2013.01); *B01D 2253/20* (2013.01); *B01D 2257/504* (2013.01); *B01D 2258/0283* (2013.01); *B01D 2259/4009* (2013.01)

(58) Field of Classification Search
CPC ............................ B01D 53/62; B01D 53/0438; B01D 2253/20; B01D 2257/504; B01D 2258/0283; B01D 2259/4009
See application file for complete search history.

(56) References Cited

U.S. PATENT DOCUMENTS

| | | | |
|---|---|---|---|
| 2008/0031801 A1* | 2/2008 | Lackner | C01F 11/18 62/602 |
| 2010/0083697 A1* | 4/2010 | Degenstein | F25J 3/0266 62/636 |
| 2012/0027663 A1* | 2/2012 | Pinard Westendorf | B01D 53/62 423/437.1 |
| 2014/0251136 A1 | 9/2014 | Park et al. | |

(Continued)

FOREIGN PATENT DOCUMENTS

| | | |
|---|---|---|
| CN | 102711956 A | 10/2012 |
| CN | 112844033 A | 5/2021 |

(Continued)

*Primary Examiner* — Christopher P Jones

(57) ABSTRACT

The present disclosure provides a carbon capture system applicable to solid amine materials with various particle sizes, including: an adsorption assembly, a separation unit, a first desorption unit, a fine powder recovery assembly, a second desorption unit and a fine powder silo assembly; wherein the adsorption assembly adsorbs carbon dioxide in external flue gas/air by solid amine with mixed particle sizes; the separation unit separates the solid amine with the mixed particle sizes; the first desorption unit desorbs the separated solid amine by bubbling; the fine powder recovery assembly screens solid amine escaping from the gas outlet end of the first desorption unit; and the second desorption unit inputs the recovered solid amine particles into the second desorption unit for vacuum desorption. The present disclosure can achieve particle size screening and match different desorption processes based on the solid amine particle size.

9 Claims, 9 Drawing Sheets

(56) References Cited

U.S. PATENT DOCUMENTS

2014/0252276 A1\* 9/2014 Chandran .............. B01D 47/10
                                                                                 96/240
2014/0331864 A1\* 11/2014 Ogino .................... B01D 53/08
                                                                                 96/145

FOREIGN PATENT DOCUMENTS

| CN | 219259626 U | 6/2023 |
| CN | 117180977 A | 12/2023 |
| CN | 117282255 A | 12/2023 |
| WO | 2023029827 A1 | 3/2023 |

\* cited by examiner

CARBON CAPTURE SYSTEM APPLICABLE TO SOLID AMINE MATERIALS WITH VARIOUS PARTICLE SIZES

CROSS-REFERENCE TO RELATED APPLICATION

This application claims priority from the Chinese patent application 2024109133549 filed Jul. 9, 2024, the content of which is incorporated herein in the entirety by reference.

TECHNICAL FIELD

The present disclosure relates to the field of carbon capture, and particularly, to a carbon capture system applicable to solid amine materials with various particle sizes.

BACKGROUND

As an emerging carbon dioxide capture material, a solid amine adsorbent is used to modify an amino group of a porous material, so that a larger specific surface area of the porous material can improve the uniformity of amino group dispersion and increase a contact area between the amino group and gas. The solid amine adsorbent has the advantages of simplicity in operation, low regeneration energy consumption and the like, and has become one of the current research hotspots in the field of carbon dioxide capture.

During the use of solid amine, a particle size of a solid amine particle gradually decreases with the material transportation and the continuous circulation of and adsorption or desorption processes, and the proportion of powdered solid amine is increasing. It is well known that the equipment corresponding to the desorption reaction of a large-particle-size solid amine powder material and a small-particle-size solid amine power material is different. Generally, a solid amine granular material has a particle size exceeding 3 mm and is mainly used in fixed bed equipment; and a powdered material has a relatively wide particle size distribution ranging from 10 μm to 1000 μm and is mainly used in fluidized bed equipment. Generally, the powdered material reacts and mixes more fully with flue gas or other low-concentration carbon dioxide under application conditions in fluidized bed equipment and has higher reaction efficiency. However, the powdered material has a relatively wide original particle size distribution and is prone to wear in fluidized bed equipment, which limits the capture scale of this technology.

Solid amine with different particle sizes requires different desorption equipment, so that solid amine particles need to be discharged from an adsorption system and then screened in a specific production process, and then enter different desorption equipment to meet the desorption requirements of the solid amine particles with different particle sizes, resulting in low work efficiency. The desorption of solid amine needs to be performed under anaerobic conditions, the desorption can only be performed under vacuum or pure $CO_2$ conditions to collect high-purity $CO_2$, and the desorbed material can be adsorbed again when the temperature is reduced. Therefore, it is necessary to formulate a process flow and equipment for solid amine carbon capture technology.

Based on this, a carbon capture system applicable to solid amine materials with various particle sizes needs to be developed.

SUMMARY

The present disclosure provides a carbon capture system applicable to solid amine materials with various particle sizes, which can solve at least one technical problem in the prior art.

Specifically, a technical solution is as follows:

A carbon capture system applicable to solid amine materials with various particle sizes includes:
- an adsorption assembly, connected to the outside, and configured to adsorb carbon dioxide in external flue gas/air by solid amine with mixed particle sizes to obtain mixed particles after carbon capture;
- a separation unit, connected to an output end of the adsorption assembly, and configured to separate the solid amine with the mixed particle sizes and collect separated solid amine;
- a first desorption unit, provided at a solid output end of the separation unit, and configured to desorb the separated solid amine by bubbling;
- a fine powder recovery assembly, provided at a gas outlet end of the first desorption unit, and configured to screen solid amine escaping from the gas outlet end of the first desorption unit to obtain recovered solid amine particles; and
- a second desorption unit, connected to an output end of the fine powder recovery assembly, and configured to input the recovered solid amine particles into the second desorption unit for vacuum desorption.

The fine powder recovery assembly includes:
- an auxiliary separation unit, connected to the gas outlet end of the first desorption unit, and configured to collect the escaped solid amine particles to obtain a to-be-recovered gas;
- an air separation and sorting unit, connected to a gas outlet end of the auxiliary separation unit, and configured to air-separate solid amine particles escaping from the gas outlet end of the auxiliary separation unit to obtain the recovered solid amine particles; wherein
- a solid output end of the air separation and sorting unit is connected to an input end of the second desorption unit and is configured to input the recovered solid amine particles into the second desorption unit for vacuum desorption.

The air separation and sorting unit includes:
- a shell, connected to the gas outlet end of the auxiliary separation unit, and configured to collect a gas to be air-separated containing the escaped solid amine particles and outputted by the gas outlet end of the auxiliary separation unit;
- a diversion mechanism, provided at a gas inlet end of the shell, and configured to divert the gas to be air-separated entering the shell to obtain diverted gas containing solid amine particles;
- an air separation mechanism, provided at one side of the shell, and configured to air-separate the solid amine particles in the diverted gas; and
- a collection mechanism, provided at another side of the shell, arranged opposite to the air separation mechanism, and configured to collect the recovered solid amine particles obtained after air separation by the air separation mechanism and input the recovered solid amine particles into the second desorption unit.

The air separation mechanism includes:
- a gas storage member, connected to an external gas source; and at least two communicating members, communicated and arranged between the gas storage member and the shell, and configured to output a pulsed airflow into the shell to air-separate the solid amine particles in the diverted gas.

The diversion mechanism includes:
a heating tube group, provided at a gas inlet end of the shell, and configured to heat the gas to be air-separated entering the shell;
a guide group, provided at the gas inlet end of the shell, positioned at one side of the heating tube group facing a bottom of the shell and configured to guide the gas to be air-separated in a grouping manner; and
a partition plate group, provided between the air separation mechanism and the collection mechanism, and configured to decelerate the gas to be air-separated after the grouping guide, so that the air separation mechanism performs air separation and the collection mechanism collects solid amine particles.

The partition plate group includes:
at least three partition plate members; and
a ventilation hole for passing a gas provided between any two transversely adjacent partition plate members; wherein
any two longitudinally adjacent partition plate members are staggered, and a space between any two longitudinally adjacent partition plate members serves as a communication passage between the air separation mechanism and the collection mechanism.

The collection mechanism includes:
a connecting member, provided at one side of the shell and arranged opposite to the air separation mechanism;
a collecting pipe, provided between the connecting member and an inner sidewall of the shell; wherein
at least two pipelines communicated with the collecting pipe are provided on the connecting member;
the collecting pipe is arranged at an output end of the air separation mechanism and is configured to collect the recovered solid amine particles; and
an output end of the collecting pipe is connected to the input end of the second desorption unit.

The shell includes:
a rectangular section, configured to provide the diversion mechanism, the air separation mechanism and the collection mechanism; and
an expansion section, connected to the rectangular section, wherein a size of one end of the expansion section far away from the rectangular section is more than twice that of the rectangular section.

The adsorption assembly includes:
a lower section unit, having a solid input end connected to the solid output end of the first desorption unit, configured to receive solid amine with mixed particle sizes, and having a gas input end connected to external flue gas/air;
a middle section unit, having an input end connected to an output end of the lower section unit, and configured for carbon capture by the solid amine with the mixed particle sizes entering the middle section unit and reducing a reaction temperature during carbon capture by the middle section unit;
an upper section unit, having an input end connected to an output end of the middle section unit, and configured to increase a flow rate for fully mixing the solid amine with mixed particle sizes;
a first Venturi tube, provided between the lower section unit and the middle section unit; and
a second Venturi tube, provided between the middle section unit and the upper section unit.

The middle section unit includes:
a middle section shell;
at least one heat exchange tube, provided at an inner sidewall of the middle section shell and configured to reduce a reaction temperature during carbon capture; and
a fin unit, provided at an outer side of the heat exchange tube, and configured to crush an agglomerated material in the solid amine with the mixed particle sizes while increasing a heat exchange area.

The carbon capture system applicable to solid amine materials with various particle sizes further includes: a fine powder silo assembly; wherein
the fine powder silo assembly is arranged between the separation unit and the second desorption unit and configured to store solid amine particles provided by the separation unit and the fine powder recovery assembly.

The fine powder silo assembly includes:
a cloth bag collecting unit, having an input end connected to a gas output end of the separation unit, and configured to collect solid amine particles escaping from the gas output end of the separation unit;
a silo, connected to a solid output end of the cloth bag collecting unit, and configured to collect the solid amine particles collected in the cloth bag collecting unit; and
a vacuum silo, connected to output ends of the silo and the fine powder recovery assembly, and configured to store the solid amine particles provided by the separation unit and the fine powder recovery assembly; wherein
the vacuum silo is connected to the second desorption unit and configured to perform vacuum desorption on the solid amine particles provided by the separation unit and the fine powder recovery assembly.

The cloth bag collecting unit includes:
a filter screen layer, configured to collect solid amine particles and discharge gas; and
the heating member, provided in a middle of the filter screen layer, and configured to dry the solid amine particles.

The first desorption unit includes:
a first desorption shell, wherein a bottom of the first desorption shell close to the ground is provided with an air inlet for introducing fluidized air;
at least two partition plates, provided in the first desorption shell, and configured to enable solid amine particles to move in the first desorption shell in a bubbling state when fluidized air is introduced;
a heating tube, provided between any two adjacent partition plates and configured to provide heat during desorption;
a filter screen, provided in the first desorption shell, and configured to intercept solid amine escaping from the gas outlet end of the first desorption unit; and
a rapping mechanism, provided on the filter screen, and configured to intermittently rap so as to enable the solid amine attached to the filter screen to fall into the first desorption shell.

An outlet of the solid output end of the separation unit is positioned at a bottom of the first desorption unit; and
an outlet of an output end of the auxiliary separation unit in the fine powder recovery assembly is positioned at a bottom of the first desorption unit, and the outlet of the output end of the auxiliary separation unit is lower than the outlet of a solid output end of the separation unit.

The carbon capture system applicable to solid amine materials with various particle sizes further includes: a booster fan; wherein the booster fan is provided between the gas output end of the fine powder recovery assembly and a gas inlet end of the first desorption unit and configured to provide fluidized air for the first desorption unit.

The present disclosure has at least the following beneficial effects:

According to the carbon capture system applicable to solid amine materials with various particle sizes of the present disclosure, the adsorption assembly is configured to adsorb carbon dioxide in external flue gas/air by using solid amine with mixed particle sizes to obtain mixed particles after carbon capture; the separation unit is configured to separate the solid amine with the mixed particle sizes and collect separated solid amine; the first desorption unit is configured to desorb the separated solid amine by bubbling; the fine powder recovery assembly is configured to screen solid amine escaping from the gas outlet end of the first desorption unit to obtain recovered solid amine particles; and the second desorption unit is configured to input the recovered solid amine particles into the second desorption unit for vacuum desorption. The carbon capture system applicable to solid amine materials with various particle sizes can achieve the screening of the particle sizes, and simultaneously, different desorption processes are matched based on the particle sizes of the solid amine, so that the solid amine material is recycled, the large-scale engineering application of the technology is achieved, and the optimal energy consumption ratio and efficiency ratio can be ensured.

The system according to the present disclosure overcomes the shortcomings of small processing capacity of vacuum desorption equipment and low material utilization rate of fluidized bed desorption equipment, and can well control materials with different particle sizes to react with the highest efficiency. Through the combination of different desorption methods, the large-scale and high-efficiency equipment of solid amine material carbon capture technology is achieved.

BRIEF DESCRIPTION OF DRAWINGS

To more clearly illustrate the technical solutions of embodiments of the present disclosure, the drawings required in the embodiments will be briefly described below. It should be understood that the following drawings only illustrate some embodiments of the present disclosure and therefore should not be considered as limitations of the scope, and for those of ordinary skill in the art, other related drawings can be obtained according to these drawings without creative efforts.

In FIGS. 1-9,

1: adsorption assembly; 2: separation unit; 3: first desorption unit; 4: fine powder recovery assembly; 5: second desorption unit; 6: fine powder silo assembly; 7: booster fan; 5A: vacuum pump, 101: lower section unit; 102: middle section unit; 103: upper section unit; 104: first Venturi tube; 105: second Venturi tube; 301: first desorption shell; 302: partition plate; 303: heating tube; 304: filter screen; 305: rapping mechanism; 401: auxiliary separation unit; 402: air separation and sorting unit; 601: cloth bag collecting unit; 602: silo; 603: vacuum silo; 1021: middle section shell; 1022: heat exchange tube; 1023: fin unit; 4021: shell; 4022: diversion mechanism; 4023: air separation mechanism; 4024: collection mechanism; 6011: filter screen layer; 6012: heating member; 40231: gas storage member; 40232: communicating member; 40221: heating tube group; 40222: guide group; 40223: partition plate group; 40241: connecting member; 40242: collecting pipe; 40211: rectangular section; 40212: expansion section; 40223A: partition plate member; and 40222B: ventilation hole.

DETAILED DESCRIPTION OF EMBODIMENTS

Those skilled in the art can understand that the modules in the devices in the implementation scenario may be distributed in the devices in the implementation scenario according to the description of the implementation scenario, and may also be positioned in one or more devices different from this implementation scenario with corresponding changes. The modules in the above implementation scenarios can be combined into one module, or can be further divided into a plurality of sub-modules.

To explain the present disclosure in detail, the following embodiments are provided, and the technical solutions of the present disclosure are explained in detail in conjunction with the accompanying drawings.

Specific Embodiment 1

Figure 1:
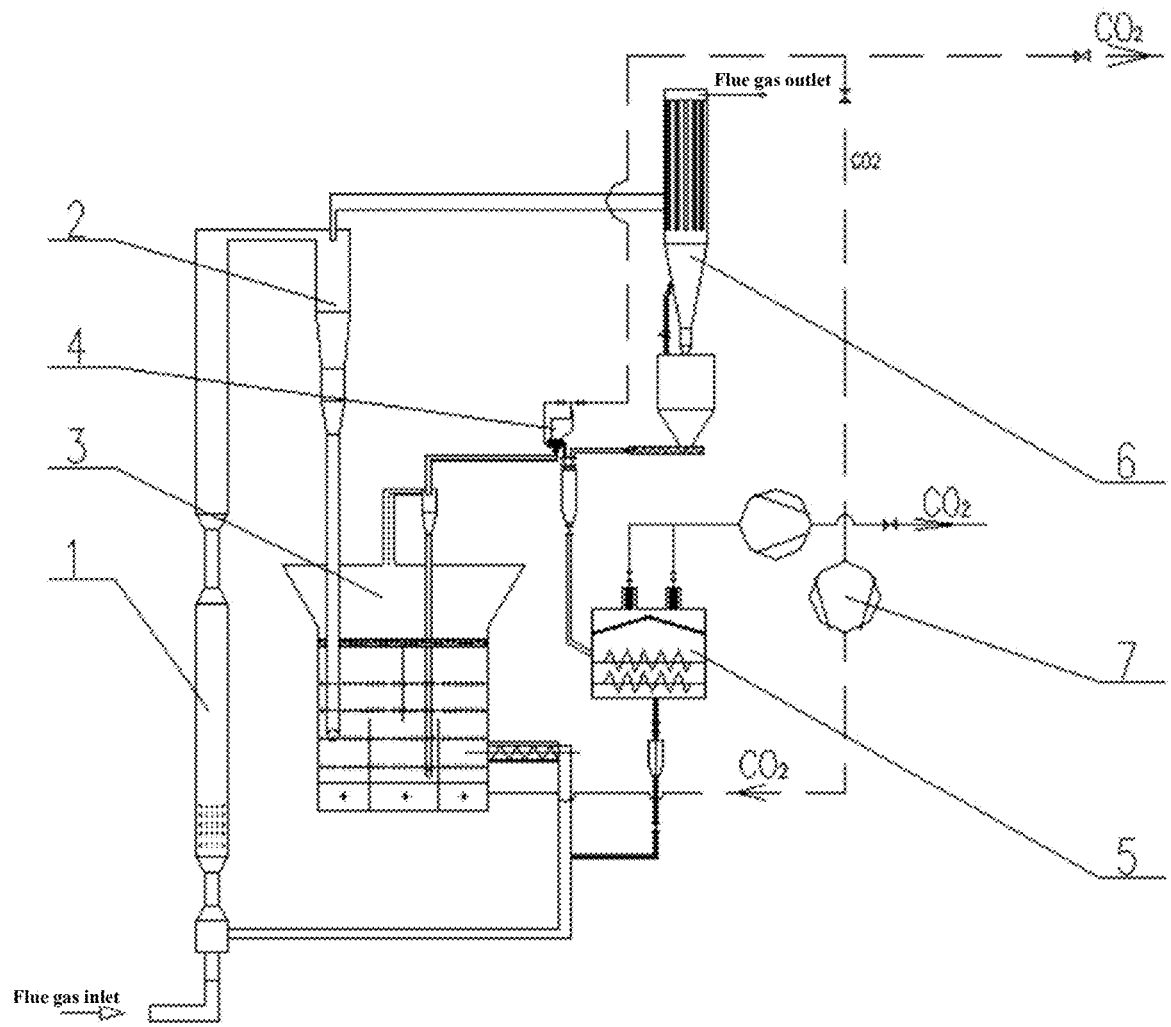
FIG. 1 is a schematic diagram of a structure of a carbon capture system according to the present disclosure.

The present disclosure provides an embodiment:

Referring to FIG. 1, a carbon capture system applicable to solid amine materials with various particle sizes includes: an adsorption assembly 1, a separation unit 2, a first desorption unit 3, a fine powder recovery assembly 4, a second desorption unit 5, a fine powder silo assembly 6, and a booster fan 7; wherein the adsorption assembly 1 is connected to the outside and configured to adsorb carbon dioxide in external flue gas/air by solid amine with mixed particle sizes to obtain mixed particles after carbon capture; the separation unit 2 is connected to an output end of the adsorption assembly 1 and configured to separate the solid amine with the mixed particle sizes and collect separated solid amine; the first desorption unit 3 is provided at a solid output end of the separation unit 2 and configured to desorb the separated solid amine by bubbling; the fine powder recovery assembly 4 is provided at a gas outlet end of the first desorption unit 3 and configured to screen solid amine escaping from the gas outlet end of the first desorption unit 3 to obtain recovered solid amine particles; and the second desorption unit 5 is connected to an output end of the fine powder recovery assembly 4 and configured to input the recovered solid amine particles into the second desorption unit 5 for vacuum desorption.

Preferably, in this embodiment, the adsorption assembly 1 is a device for carbon capture by solid amine particles of mixed particle sizes; the first desorption unit 3 is a bubbling bed; and the second desorption unit 5 is vacuum desorption equipment.

Figure 2:
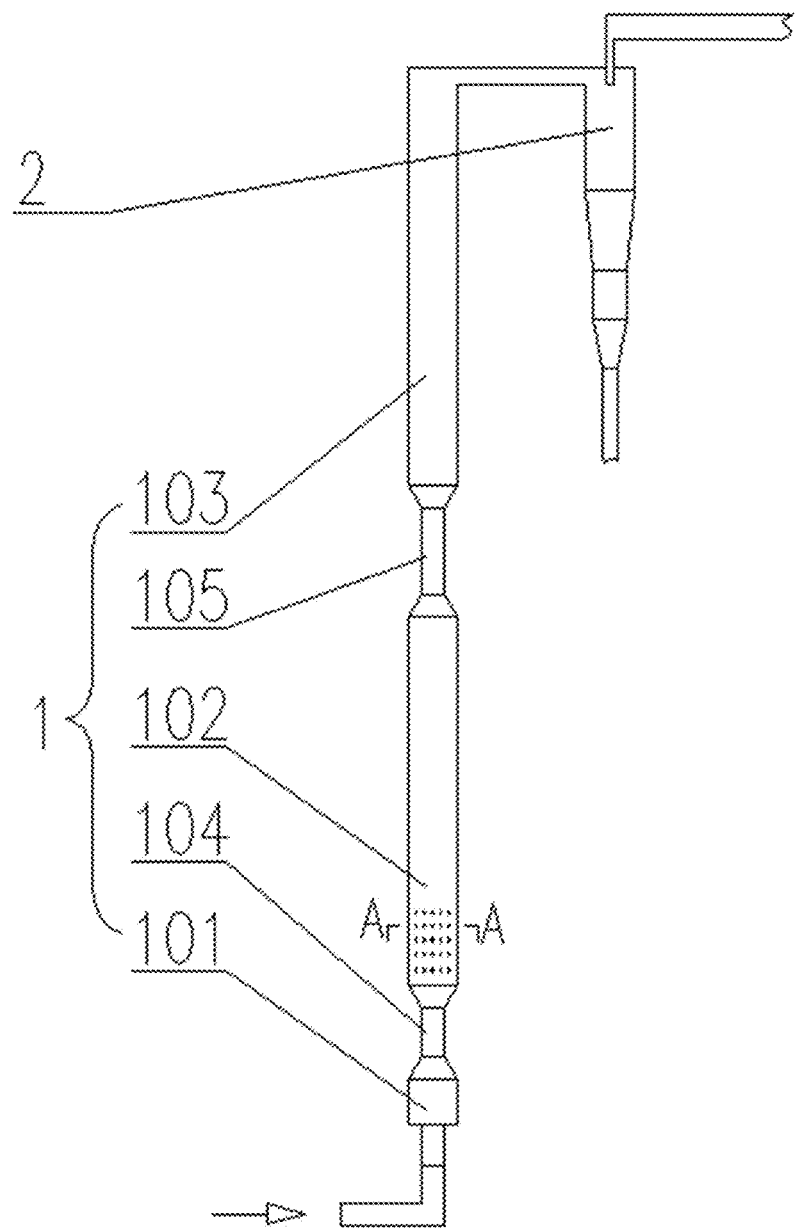
FIG. 2 is a schematic diagram of a structure of an adsorption assembly in FIG. 1.

Specifically, as shown in FIG. 2, the adsorption assembly 1 includes: a lower section unit 101, a middle section unit 102, an upper section unit 103, a first Venturi tube 104, and a second Venturi tube 105; a solid input end of the lower section unit 101 is connected to the solid output end of the first desorption unit 3 for receiving solid amine with mixed particle sizes, and a gas input end of the lower section unit 101 is connected to external flue gas/air; an input end of the middle section unit 102 is connected to an output end of the first Venturi tube 104 for carbon capture by using the solid amine with the mixed particle sizes entering the middle section unit 102 and reducing a reaction temperature during carbon capture by the middle section unit 102; an input end of the upper section unit 103 is connected to an output end of the second Venturi tube 105 for increasing a flow rate to fully mix the solid amine with mixed particle sizes; the first Venturi tube 104 is provided between the lower section unit 101 and the middle section unit 102; and the second Venturi tube 105 is provided between the middle section unit 102 and the upper section unit 103.

In this embodiment, the adsorption assembly 1 includes a two-stage Venturi structure, so that the flue gas containing carbon dioxide quickly flows in from the lower section unit 101, and meanwhile, large-particle-size solid amine is added from the lower section unit 101 to increase the flow rate and break up agglomerated particle clusters; then the airflow enters the middle section unit 102 to achieve the full mixing and adsorption between the solid amine material and the flue gas; adsorption may be achieved at room temperature, heat is released due to adsorption reaction, the middle section unit 102 is provided with a cooling water coil and a cooling water jacket, so that the adsorption reaction is favorably performed, the upper section unit 103 is arranged on an upper layer of the middle section unit 102, an inlet for adding small-size materials is designed on the upper section unit 103, and no cooling coil is arranged; after the materials pass through the upper section unit 103, the flow rate is increased, and the large-particle-size material is fully mixed with the small-particle-size material, so that carbon dioxide in the flue gas is further adsorbed. The added small-particle-size material can reduce the average temperature of the materials and is beneficial to the reaction, so that the concentration of carbon dioxide in the upper section unit 103 is low, and the exothermic amount of the adsorption reaction is small. The upper section unit 103 is not provided with a cooling coil and is only provided with a water cooling jacket, so that the wear of the small-particle-size materials can be reduced. Through the connection mode of the lower section unit 101, the middle section unit 102, the upper section unit 103, the first Venturi tube 104 and the second Venturi tube 105, the uniform bed temperature, high adsorption efficiency and low wear rate are achieved.

Figure 3:
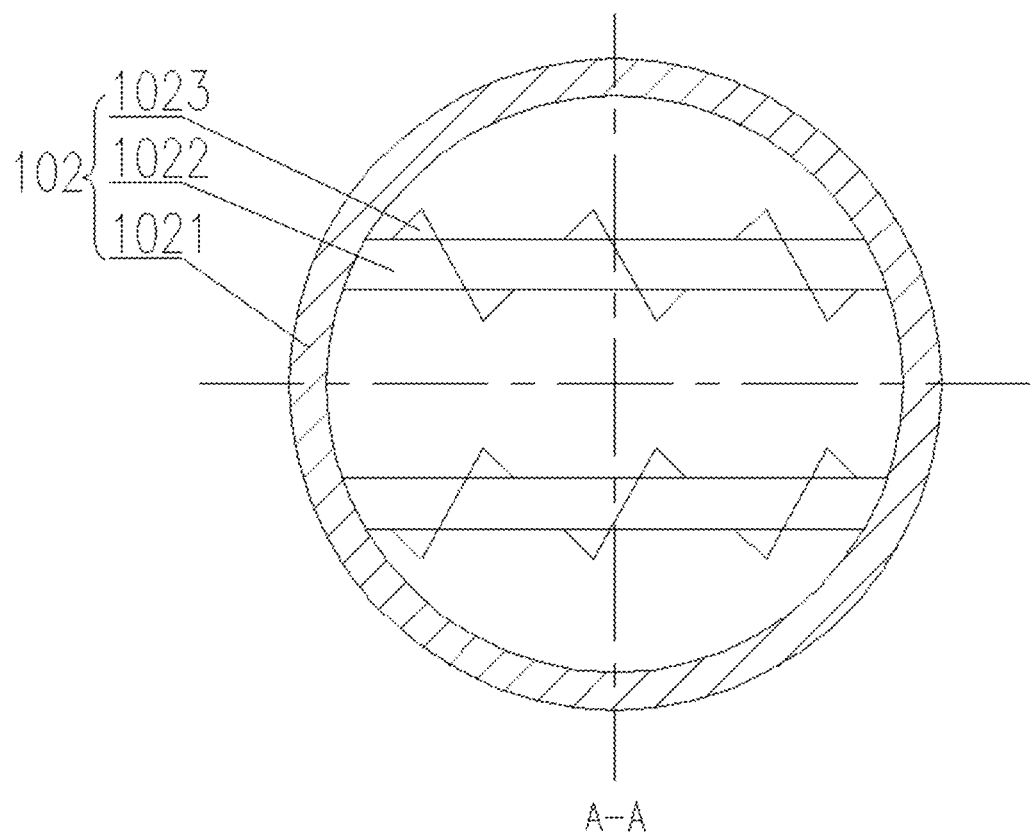
FIG. 3 is a cross-sectional view taken along the line A-A in FIG. 2.

Specifically, as shown in FIG. 3, the middle section unit 102 includes: a middle section shell 1021, at least one heat exchange tube 1022, and a fin unit 1023; wherein the heat exchange tube 1022 is provided at an inner sidewall of the middle section shell 1021 and configured to reduce a reaction temperature during carbon capture; and the fin unit 1023 is provided at an outer side of the heat exchange tube 1022 and configured to crush an agglomerated material in the solid amine with the mixed particle sizes while increasing a heat exchange area. Preferably, the structure of the middle section unit 102 is similar to a jacket type, and cooling water is introduced between layers to cool and carry away the heat release of the adsorption reaction; the middle section unit 102 is provided with a heat exchange tube bundle with fins, which is parallel to a cross-sectional direction, and removes the heat released by the adsorption reaction through violent convection flushing. Meanwhile, the sharp edges of the fins can disperse and crush large-particle-size agglomerated materials. The cross-sectional flow rate of the middle section unit 102 is 1-1.5 m/s, the cross-sectional flow rate of the first Venturi tube 104 and the second Venturi tube 105 are both 2-3 m/s, and the total height of the adsorption assembly 1 is 25-30 m.

Specifically, the separation unit 2 is arranged at the output end of the adsorption assembly 1, and may separate the solid amine with the mixed particle sizes and collect the separated solid amine. Preferably, the separation unit 2 is a cyclone separator with a material separation efficiency of 85%-90%, the materials reaching the cyclone separator stay at least in the adsorption assembly 1 for 30 s, the adsorption reaction time of the solid amine materials is met, the adsorption efficiency exceeds 95%, and large-particle-size materials enter the bubbling bed desorption equipment by a discharge opening of the cyclone separator. However, due to the operating characteristics of the bubbling bed, during the collection in the separation unit 2, some solid amine particles with mixed particle sizes, in a range of 1-100 μm, escapes from the top of the bubbling bed, i.e., the gas output end. The separation unit 2 described in this embodiment collects 50-1000 μm solid amine particles; a suitable separation efficiency may be used, where too high separation efficiency may cause an inlet flow rate to be too high, thereby aggravating wear of the materials, and too low separation efficiency may cause a proportion of small-particle-size material in the materials transported to the next bubbling bed to be higher, and the small-particle-size materials may not reach a heating time required for desorption reaction, resulting in a reduced desorption efficiency. Therefore, the separator is set to 85%-90% separation efficiency to achieve an optimal effect for the materials through experiments and distribution of processing capacity of the rear-end desorption equipment. An inner surface of the separation unit 2 is specially coated to reduce surface roughness and reduce material wear in the equipment.

Figure 4:
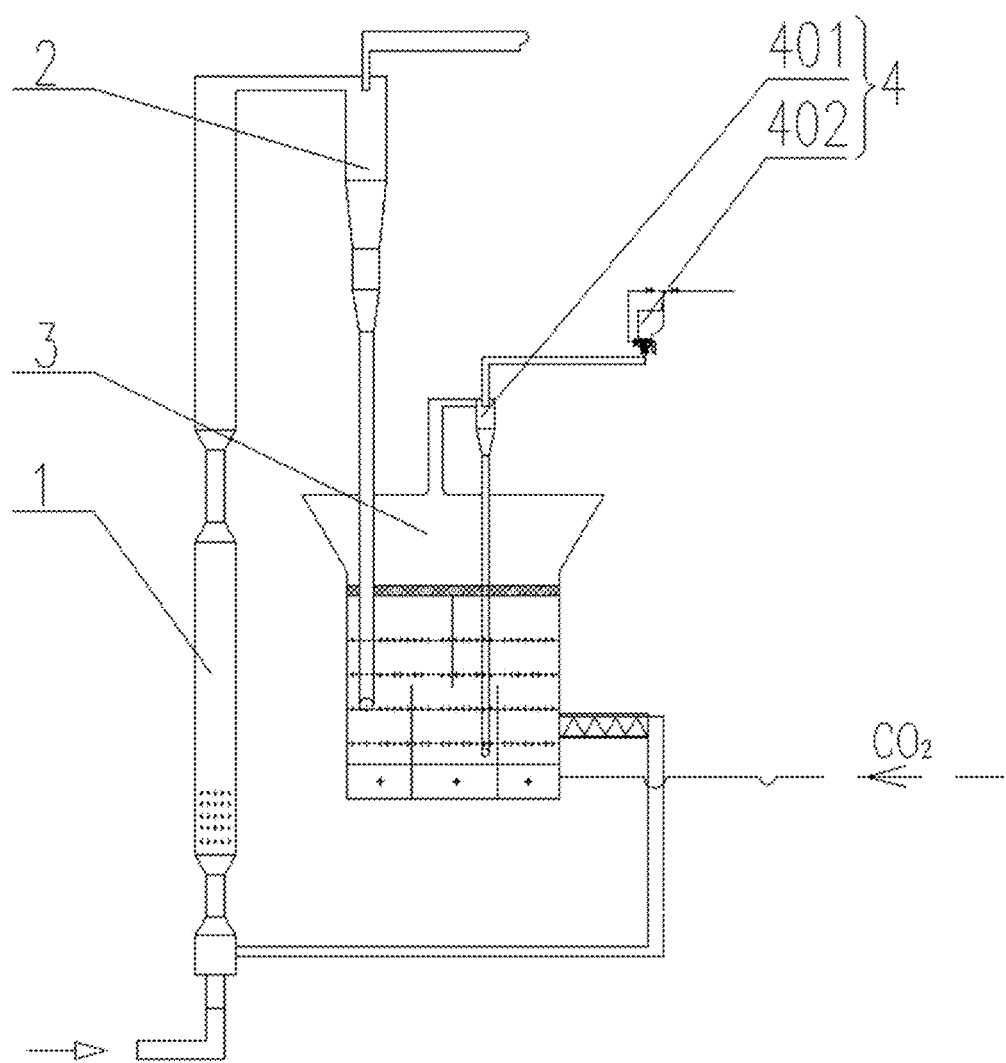
FIG. 4 is a schematic diagram of a structure of a fine powder recovery assembly in FIG. 1.

To increase the desorption rate by making some solid amine return to the desorption process again, this embodiment provides the following fine powder recovery module 4. As shown in FIG. 4, the fine powder recovery assembly 4 includes: an auxiliary separation unit 401 and an air separation and sorting unit 402; wherein the auxiliary separation unit 401 is connected to the gas outlet end of the first desorption unit 3 and configured to collect the escaped solid amine particles to obtain a to-be-recovered gas; the air separation and sorting unit 402 is connected to a gas outlet end of the auxiliary separation unit 401 and configured to air-separate solid amine particles with particle sizes of 1-100 μm escaping from the gas outlet end of the auxiliary separation unit 401 to obtain the recovered solid amine particles; a solid output end of the air separation and sorting unit 402 is connected to an input end of the second desorption unit 5 and is configured to input the recovered solid amine particles into the second desorption unit 5 for vacuum desorption.

Preferably, the auxiliary separation unit 401 may be a cyclone separator, which collects solid amine particles of 50-100 μm; however, some solid amine particles also escape from the gas output end of the auxiliary separation unit. To collect these solid amine particles, this embodiment uses the air separation and sorting unit 402.

The auxiliary separation unit 401 is configured to capture a small amount of powder materials escaping with carbon dioxide, the capture efficiency of the auxiliary separation unit 401 is more than 90%, 50-100 μm of fine powder is mainly separated through the control of the inlet air speed, about 10% of fine powder exits from the airflow outlet at the upper part of the separation unit 2 and enters the fine powder recovery assembly 4, although the proportion of the fine powder is small, the total mass is still large, if the fine powder is not collected, the rear-end equipment is blocked, and the price of the adsorbent is high, so that the fine powder needs to be collected as much as possible to enable the system to run economically. The main difference between the auxiliary separation unit 401 and the separation unit 2 is that an inlet flow rate of the auxiliary separation unit is low. Since the particle size of this part of the powder is already very small, too high inlet air speed aggravates material wear and causes excessive loss of the adsorbent.

An outlet at a bottom of the auxiliary separation unit 401 extends into a material layer of the first desorption unit 3, and the incompletely reacted materials are collected to form a small circulation of the materials, so that the escape of the powder materials is reduced, the reaction efficiency is improved, the retention time of the materials in the bed can be prolonged, and the carbon dioxide is completely desorbed.

Figure 5:
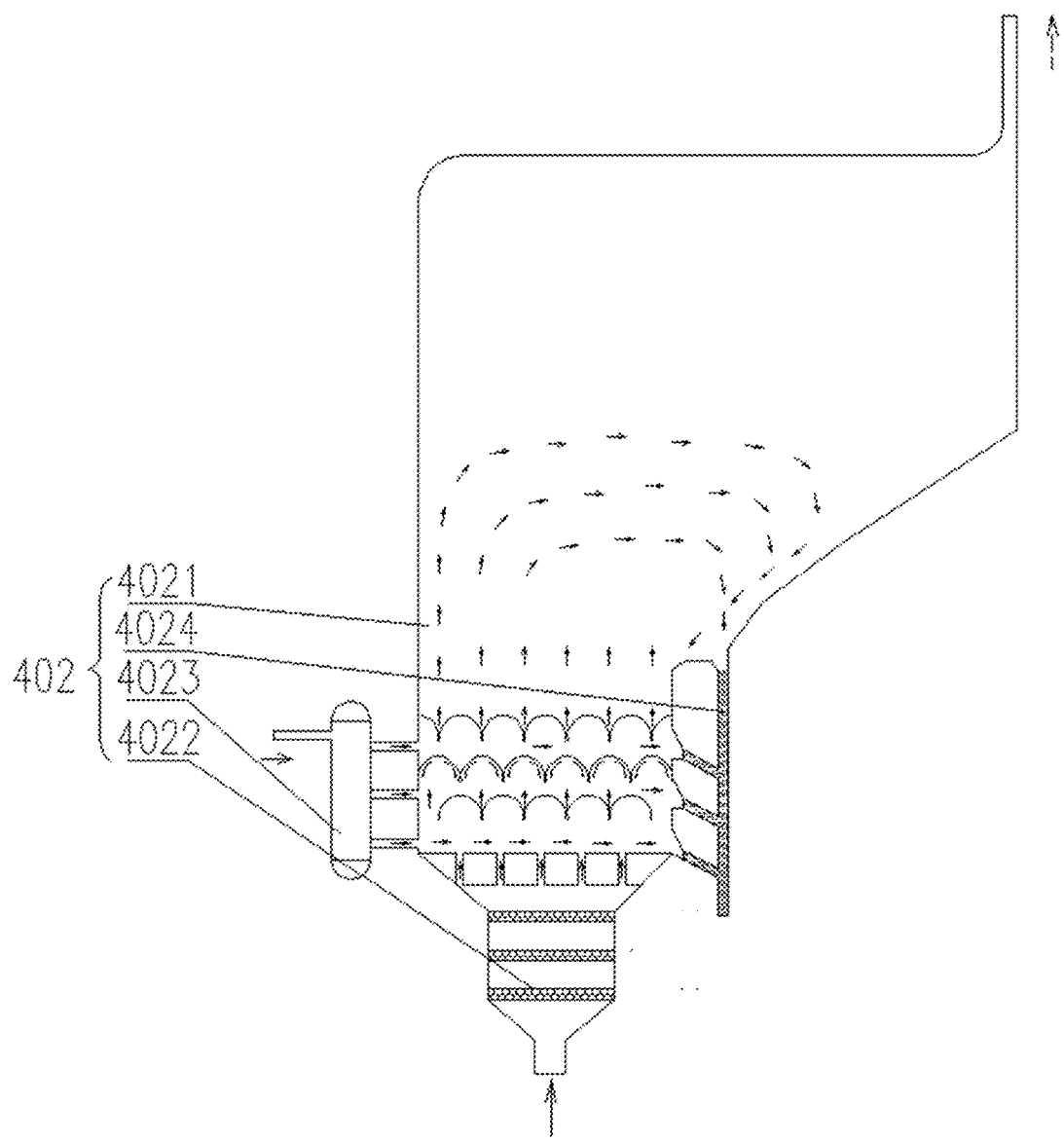
FIG. 5 is a schematic diagram of a structure of an air separation and sorting unit in FIG. 4.

Specifically, as shown in FIG. 5, the air separation and sorting unit 402 includes: a shell 4021, a diversion mechanism 4022, an air separation mechanism 4023 and a collection mechanism 4024; wherein the shell 4021 is connected to the gas outlet end of the auxiliary separation unit 401 and configured to collect a gas to be air-separated containing the escaped solid amine particles and outputted by the gas outlet end of the auxiliary separation unit 401; the diversion mechanism 4022 is provided at a gas inlet end of the shell 4021 and configured to divert the gas to be air-separated entering the shell 4021 to obtain diverted gas containing solid amine particles; the air separation mechanism 4023 is provided at one side of the shell 4021 and configured to air-separate the solid amine particles in the diverted gas; and the collection mechanism 4024 is provided at another side of the shell 4021, arranged opposite to the air separation mechanism 4023 and configured to collect the recovered solid amine particles obtained after air separation by the air separation mechanism 4023 and input the recovered solid amine particles into the second desorption unit 5.

Figure 6:
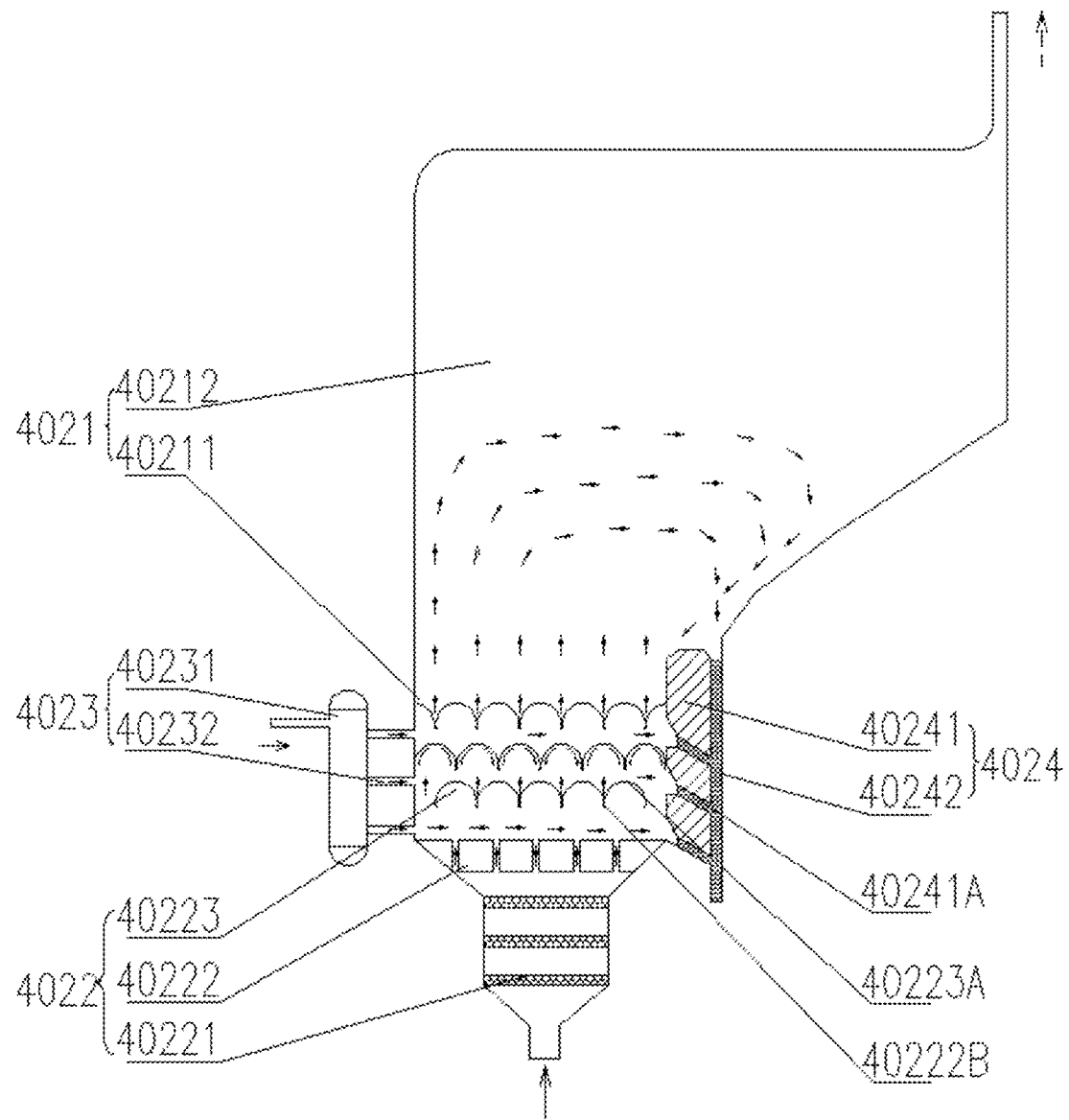
FIG. 6 is a schematic diagram of a structure of a shell, a diversion mechanism, an air separation mechanism and a collection mechanism in FIG. 5.

Preferably, as shown in FIG. 6, the air separation mechanism 4023 includes: a gas storage member 40231 and three communicating members 40232; wherein the gas storage member 40231 is connected to an external gas source; and the communicating members 40232 are communicated and arranged between the gas storage member 40231 and the shell 4021 and configured to output a pulsed airflow into the shell 4021 to air-separate the solid amine particles in the diverted gas. When in use, a gas source is provided by the gas storage member 40231, and a pulsed gas flow is intermittently blown into the shell 4021 in sequence by the parallel three communicating members 40232, so that solid amine particles with different particle sizes are blown out and collected by the air separation method due to the difference in the sizes and weights of the solid amine particles, and 1-50 μm of the solid amine particles may be mainly collected.

To fully blow up the solid amine particles and facilitate air separation, as shown in FIG. 6, the diversion mechanism 4022 includes: a heating tube group 40221, a guide group 40222 and a partition plate group 40223; wherein the heating tube group 40221 is provided at a gas inlet end of the shell 4021 and configured to heat the gas to be air-separated entering the shell 4021; the guide group 40222 is provided at the gas inlet end of the shell 4021, positioned at one side of the heating tube group 40221 facing a bottom of the shell 4021 and configured to guide the gas to be air-separated in a grouping manner; and the partition plate group 40223 is provided between the air separation mechanism 4023 and the collection mechanism 4024 and configured to decelerate the gas to be air-separated after the grouping guide, so that the air separation mechanism 4023 performs air separation and the collection mechanism 4024 collects solid amine particles.

An outlet at a bottom of the auxiliary separation unit 401 extends into a material layer of the bubbling bed, and the incompletely reacted materials are collected to form a small circulation of the materials, so that the escape of the powder materials is reduced, the reaction efficiency is improved, the retention time of the materials in the bed can be prolonged, and the carbon dioxide is completely desorbed. Since the retention time of the materials entering the air separation and sorting unit 402 in the first desorption unit 3 is short, the materials are not sufficiently heated and the desorption is insufficient, the carbon dioxide is easily adsorbed again when the temperature is reduced. To avoid this situation, the airflow firstly passes through the heating tube group 40221, the temperature of the heating tube group 40221 is controlled to 110-160° C., and the materials are ensured not to be cooled when flowing through the heating tube group 40221 and are further heated and desorbed.

Preferably, as shown in FIG. 6, the partition plate group 40223 includes: at least three partition plate members 40223A and a ventilation hole 40222B for passing a gas provided between any two transversely adjacent partition plate members 40223A; wherein any two longitudinally adjacent partition plate members 40223A are staggered, and a space between any two longitudinally adjacent partition plate members 40223A serves as a communication passage between the air separation mechanism 4023 and the collection mechanism 4024.

As shown in FIG. 6, the collection mechanism 4024 includes: a connecting member 40241 and a collecting pipe 40242; wherein the connecting member 40241 is provided at one side of the shell 4021 and arranged opposite to the air separation mechanism 4023; the collecting pipe 40242 is provided between the connecting member 40241 and an inner sidewall of the shell 4021; at least two pipelines 40241A communicated with the collecting pipe 40242 are provided on the connecting member 40241; the collecting pipe 40242 is arranged at an output end of the air separation mechanism 4023 and is configured to collect the recovered solid amine particles; and an output end of the collecting pipe 40242 is connected to the input end of the second desorption unit 5.

As shown in FIG. 6, the shell 4021 includes: a rectangular section 40211 and an expansion section 40212; wherein the rectangular section 40211 is configured to provide the diversion mechanism 4022, the air separation mechanism 4023 and the collection mechanism 4024; and the expansion section 40212 is connected to the rectangular section 40211, wherein a size of one end of the expansion section far away from the rectangular section 40211 is more than twice that of the rectangular section 40211.

When in use, the guide group 40222 is arranged above the heating tube group 40221 along the direction of airflow, and the guide group 40222 may increase the rigidity of airflow, strengthen flow and prevent falling powder from blocking air holes. The powder enters the partition plate group 40223 after passing through the gas inlet hole formed by the guide group 40222 along with the airflow. The partition plate group 40223 intercepts fine powder by a plurality of layers of semicircular partition plate members 40223A tightly connected, the airflow penetrates out of gaps among the partition plate members 40223A, most of the fine powder is intercepted by the partition plate members 40223A, moves downwards and falls on the surface of the bottom or the lower partition plate member 40223A. The carbon dioxide blown out in a pulsating manner from a side communicating member 40232 blows the powder into the pipeline 40241A on the opposite side. The collecting pipe 40242 is connected to an inclined pipeline 40241A and converges into the collecting pipe 40242, so that a certain material level is always maintained in the pipeline 40241A, which plays a role in sealing the material. In the shell 4021, after passing through the multi-stage partition plate member 40223A, a small amount of fine powder escapes with the airflow. The expansion section 40212 is arranged above the partition plate member 40223A, the expansion section 40212 is an eccentric slow flow area, and a spatial cross-section of this expansion section is 3-5 times that of the rectangular section 40211, so that the airflow velocity drops sharply. Under the action of gravity, the powder material forms an internal circulation with the airflow and the eccentric structure, and is captured by the collecting pipe 40242 in the process of falling. A gas phase inlet of the shell 4021 is at the top of the auxiliary separation unit 401, and pure carbon dioxide is obtained after air separation. An outlet of the shell 4021 is an exhaust port and may be connected to a rear-end carbon dioxide storage device; or connected to a booster fan to introduce an air chamber at a bottom of the bubbling bed to be used as fluidized air, or connected to a compression pulse tank to be used as an air source of the gas storage member 40231.

Figure 7:
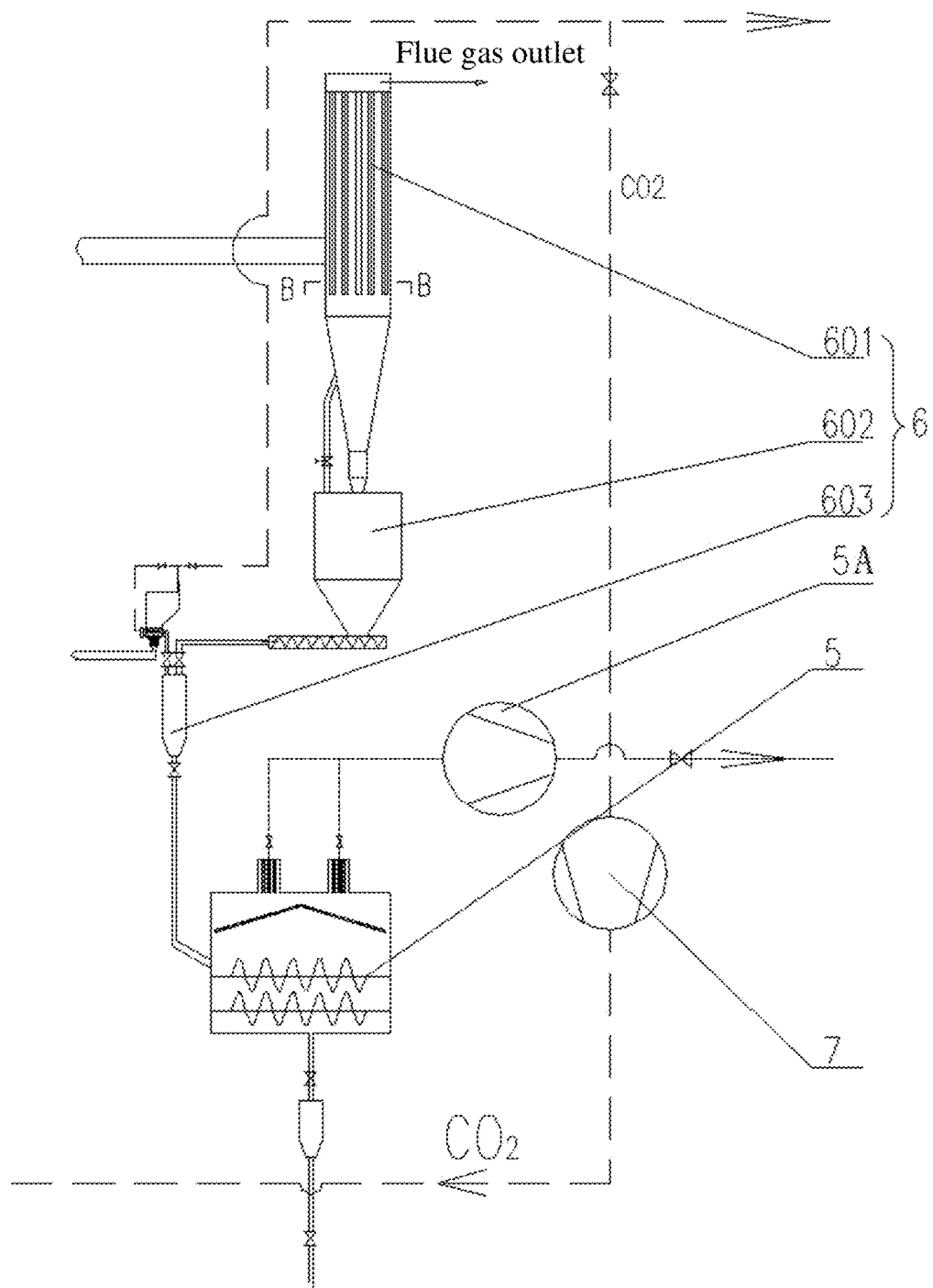
FIG. 7 is a schematic diagram of a structure of a fine powder silo assembly in FIG. 1.

Specifically, as shown in FIG. 7, the fine powder silo assembly 6 is arranged between the separation unit 2 and the second desorption unit 5 and configured to store solid amine particles provided by the separation unit 2 and the fine powder recovery assembly 4. Preferably, the fine powder silo assembly 6 includes: a cloth bag collecting unit 601, a silo 602 and a vacuum silo 603; wherein the cloth bag collecting unit 601 has an input end connected to a gas output end of the separation unit 2 and is configured to collect solid amine particles escaping from the gas output end of the separation unit 2; the silo 602 is connected to a solid output end of the cloth bag collecting unit 601 and configured to collect the solid amine particles collected in the cloth bag collecting unit 601; the vacuum silo 603 is connected to output ends of the silo 602 and the fine powder recovery assembly 4 and configured to store the solid amine particles provided by the separation unit 2 and the fine powder recovery assembly 4; and the vacuum silo 603 is connected to the second desorption unit 5 and configured to perform vacuum desorption on the solid amine particles provided by the separation unit 2 and the fine powder recovery assembly 4.

Preferably, the traditional powder collection generally adopts a cloth bag form; however, the technical conditions in this embodiment are not suitable for the cloth bag collection mode, mainly for two reasons: firstly, the processing volume of fine powder is large and the temperature is high, which requires a very large bag volume to match; secondly, the desorption process requires an anaerobic environment, and only pure carbon dioxide can be introduced as a pulsed separation gas, which consumes a large amount of carbon dioxide, and the desorption gas volume cannot meet the requirements.

Figure 8:
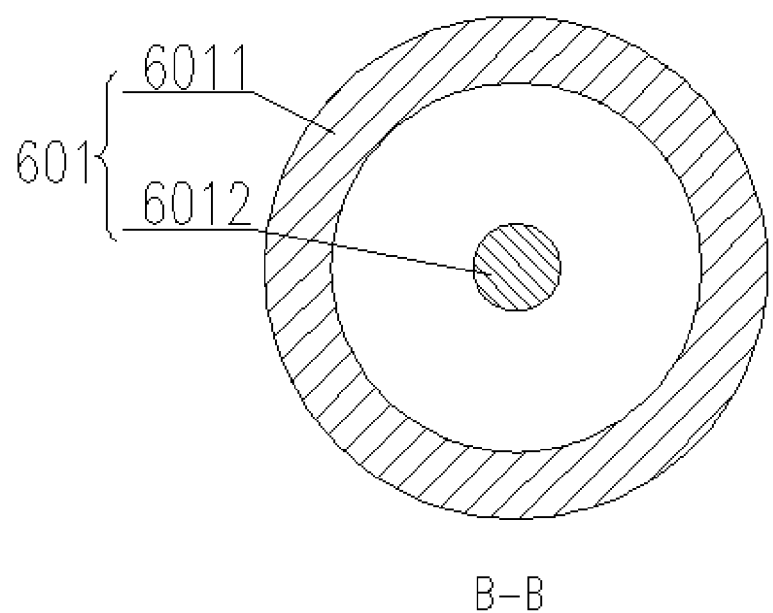
FIG. 8 is a cross-sectional view taken along the line B-B in FIG. 7.

As shown in FIG. 8, the cloth bag collecting unit 601 includes: a filter screen layer 6011 and a heating member 6012; wherein the filter screen layer 6011 is configured to collect solid amine particles and discharge gas; and the heating member 6012 is provided in a middle of the filter screen layer 6011 and configured to dry the solid amine particles.

During specific use, the filter screen layer 6011 is a metal filter screen that can collect 5-50 μm of materials. The flue gas flows out after passing through the filter screen layer 6011. A heating element 6012, such as an electric heating rod, is arranged axially in a center of each filter screen layer 6011, which is controlled at a temperature of 90° C. The material is heated to 70° C. through radiation heat exchange of the heating element 6012, and the first drying is performed. The purpose is to increase the temperature of the material entering the second desorption unit, shorten the time of the vacuum desorption reaction, and dry the water adsorbed in the material, thereby reducing the energy consumption of the desorption equipment and the energy consumption of the vacuum pump 5A.

Figure 9:
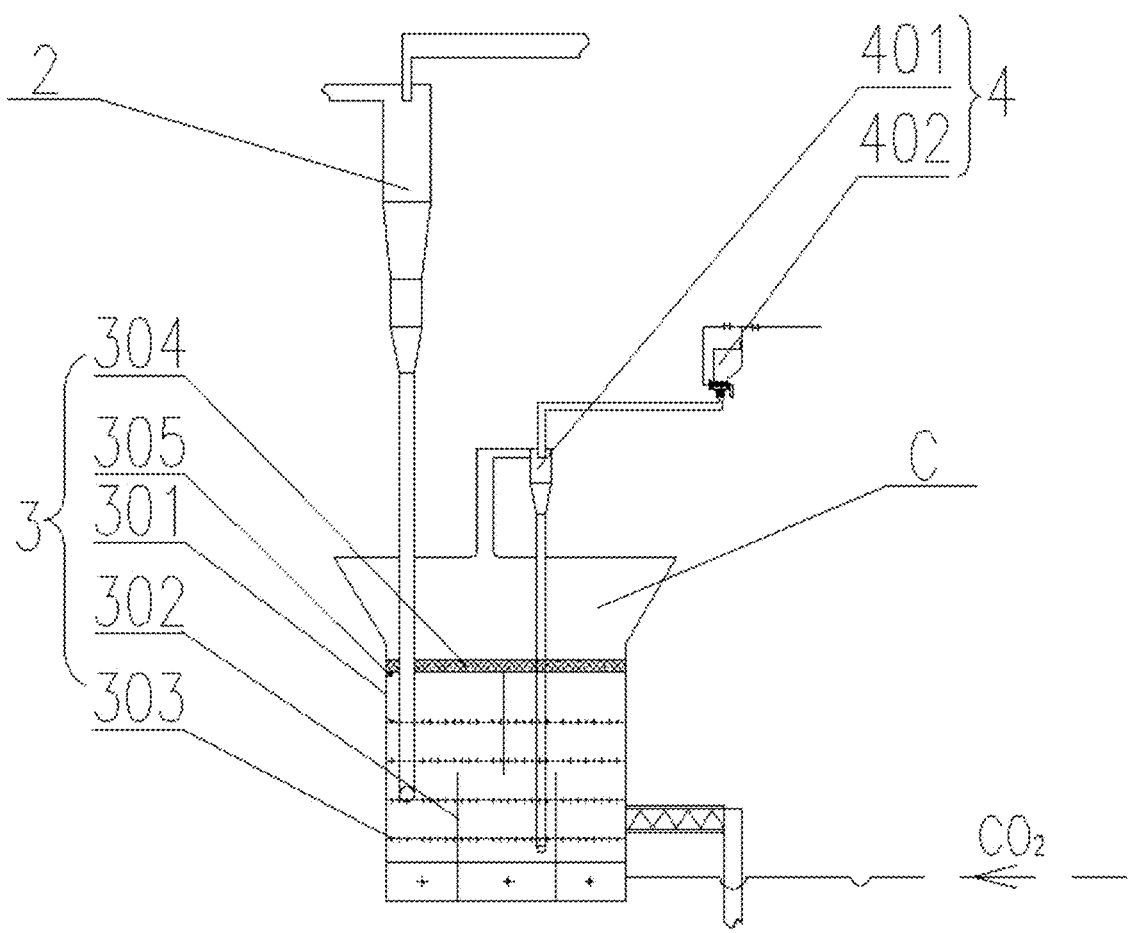
FIG. 9 is a schematic diagram of a structure of a first desorption unit.

The first desorption unit 3, as shown in FIG. 9, includes: a first desorption shell 301, at least two partition plates 302, a heating tube 303, a filter screen 304 and a rapping mechanism 305; wherein a bottom of the first desorption shell 301 close to the ground is provided with an air inlet for introducing fluidized air; at least two partition plates 302 are provided in the first desorption shell 301 and configured to enable solid amine particles to move in the first desorption shell 301 in a bubbling state when fluidized air is introduced; the heating tube 303 is provided between any two adjacent partition plates 302 and configured to provide heat during desorption; the filter screen 304 is provided in the first desorption shell 301 and configured to intercept solid amine escaping from the gas outlet end of the first desorption unit 3; and the rapping mechanism 305 is provided on the filter screen 304 and configured to intermittently rap so as to enable the solid amine attached to the filter screen 304 to fall into the first desorption shell 301.

When in use, the first desorption unit 3 is bubbling bed desorption equipment, which enables large-particle-size materials to flow from a material inlet to an outlet in a bubbling state when carbon dioxide fluidized air at the bottom is introduced through the multi-stage zigzag partition plates 302 vertically and alternately arranged, the heating tubes 303 are horizontally and densely distributed in each stage of partition plates 302, and steam with a temperature of 110-160° C. flows in the heating tubes 303, so that the materials are continuously heated to the desorption temperature by the steam pipe bundle in the fluidizing process, thereby releasing a large amount of carbon dioxide. A portion of the carbon dioxide gas, about 20-30%, is returned to the bubbling bed for circulation as fluidized air, and the other portion is collected and condensed and compressed together with the carbon dioxide discharged from the second desorption unit. The cross-section of the fluidized area at the lower part of the first desorption unit 3 is rectangular, and the upper part is widened, such as at C in FIG. 9, and the cross-sectional area of the upper part is more than twice that of the lower part, which can reduce the airflow velocity, so that the fine powder rising with the desorbed carbon dioxide falls, thereby reducing the amount of fine powder entering the fine powder recovery assembly 4. By controlling the flow rate, a small amount of fine powder of 50-100 μm in the bed enters the auxiliary separation unit 401, accounting for 1-3% of the total mass in the bubbling bed. A very small amount of fine powder is worn down during the fluidization process in the bed. The fine powder with a particle size range of 1-100 microns enters the fine powder recovery assembly 4 with the airflow. The material with a particle size below 1 micron is not collected due to difficult recycling. An outlet end of the first desorption unit 3 adopts a water cooling jacket to gradually cool the material to be below 100° C., and the material is naturally cooled to be below 60° C. gradually at the descending section after the spiral section, and is pneumatically conveyed into the adsorption assembly 1 to participate in the next circulating reaction.

Meanwhile, the upper part of the first desorption unit 3 is also provided with a metal filter screen 304 to intercept part of the solid amine powder escaping with the gas, the four corners of the metal filter screen are provided with rapping mechanisms 305, and materials attached to the filter screen 304 intermittently drop into the bubbling bed through rapping so as to reduce the resistance in the bed. The filter screen 304 is in sealed contact with the periphery of the bubbling bed without gaps. A volume of the first desorption unit 3 is 30-50 m$^3$, a height of a static material layer is 0.5-0.8 m, and a height of the heating layer is 1.5-2.0 m.

The second desorption unit 5 includes four upper and lower hollow shafts and hollow spiral blades connected thereto. The heating steam flows inside the hollow structure, and the spiral blades turn and stir the material while heating and pushing the material to move, thereby improving the heat transfer coefficient and shortening the heating time. The material inlet and outlet of the spiral vacuum desorption equipment are provided with a sealed shut-off valve, a vacuum feed bin, and a vacuum cooling bin. The material in the vacuum feed bin is loaded into the vacuum desorption equipment by opening the sealed shut-off valve, the continuous operation of the desorption equipment can be ensured, the desorption time is 1 h, the desorption efficiency is over 95%, the desorption temperature is 80-130° C., the material processing capacity is 1-3 t/h, and 100-300 kg/h of carbon dioxide is generated. The second desorption unit 5 adopts a 4-axis upper and lower layer arrangement, the lower spiral plays a material conveying role, and the upper spiral rotates in the opposite direction to the lower spiral, so that the pushed material moves in the opposite direction, thereby intensifying the stirring effect and improving the heat transfer coefficient. Double-end mechanical seals are used at two ends of the spiral bearing to ensure the sealing effect under extremely low vacuum. Two metal filter screen bundle exhaust covers are designed at the air outlet and are connected to a vacuum pump 5A, one filter screen bundle is opened and another filter screen bundle is closed during normal desorption, and carbon dioxide blowback is performed on the closed filter screen bundle so as to eliminate the influence of small particles on the blockage of the filter screen on desorption. The metal filter screen bundle adopts two exhaust ports to switch operation. Since the particle size of the material in the vacuum desorption equipment is extremely small, which is easy to be discharged along with the air suction of a vacuum pump 5A in the desorption process to block the filter screen, to reduce the back blowing and switching times of the filter screen, 10-20 metal filter screens are arranged on each group of exhaust covers, the filter screen has a filtering precision of 1 μm, the filter screens are combined and arranged in front of the exhaust ports, when the front and back pressure of the filter screens reaches a set value, and carbon dioxide is back blown to the filter screen bundle; to ensure the purity of the collected gas, other gases cannot be back blown, the fine powder is easy to block the filter screen to cause frequent back blowing, therefore, a filter screen layer is arranged in front of the exhaust ports above the screw shaft to cover the entire spiral desorption equipment, which has a filtering precision of 10 microns. The vibrators are arranged at four corners of the filter screen layer, and the vibration is set at intervals, so that most of the small-particle-size particles escaping from the bed of the desorption equipment with the gas can be intercepted. There is a 3 mm gap between the filter screen layer and an inner wall of the desorption equipment. The filter screen is a pointed top structure, which is used to allow a small amount of small-particle-size particles that are blown down by the filter screen bundle and adhered to the wall to fall into the desorption equipment. Meanwhile, the fluidized air used by the second desorption unit is superheated steam with a temperature of 110-150° C., the material is rapidly heated to the desorption temperature under the fluidization effect of the superheated steam, and the desorption efficiency is more than 90% within 1 h of desorption time. The desorption material is heated through the densely distributed coils, heat required by reaction is provided, the water vapor is still in a superheated state at the air outlet of the second desorption unit, the mixed gas in the state is introduced into the heating spiral of the second desorption unit, heat is continuously provided for the vacuum desorption equipment, and after the mixed gas releases latent heat of vaporization, and the separation of the carbon dioxide and the water vapor is realized at the air exhaust end, so that not only is the fluidized desorption achieved, but also the gradient utilization of the heat of the steam is achieved.

Specifically, an outlet of the solid output end of the separation unit 2 is positioned at a bottom of the first desorption unit 3; an output end outlet of the auxiliary separation unit 401 in the fine powder recovery assembly 4 is positioned at a bottom of the first desorption unit 3, and the output end outlet of the auxiliary separation unit 401 is lower than the outlet of a solid output end of the separation unit 2. In addition, the booster fan 7 is provided between the gas output end of the fine powder recovery assembly 4 and a gas inlet end of the first desorption unit 3 and configured to provide fluidized air for the first desorption unit 3.

The system provided by the present disclosure adopts two different desorption methods and desorption units. The combination of the two methods uses the advantages of equipment, so that solid amine powder materials with a larger particle size distribution can be used, thus realizing large-scale industrial capture of solid amine materials.

Since the vacuum desorption method is subject to factors such as the difficulty of processing materials and equipment and the consumption of steel, the vacuum desorption is not easy to scale up. The conventional processing capacity of solid amine materials is 1-3 t/h. When the processing scale exceeds 3 t/h, the equipment has a shaft length of more than 10 m and a volume of more than 30 m$^3$, which has large processing difficulty, the sealing effect at the rotating shaft is poor, and the steel consumption and price are more than 5 times that of fluidized bed desorption equipment, and the technical and economic performance are poor. Meanwhile, the bubbling bed desorption equipment can process larger-scale solid amine materials, but has a higher requirement on the uniformity of the particle size of the materials. With the proceeding of the reaction, part of the materials are seriously worn, the large-particle-size materials are changed into small-particle-size materials, and new large-particle-size materials are continuously supplemented in the adsorption equipment; consequently, the requirement on the uniformity of the materials cannot be met. When the small-particle-size materials enter the bubbling bed desorption equipment and are rapidly blown out of a bed by fluidized air, the small-particle-size materials cannot be heated to the desorption temperature and cannot meet the reaction time of staying for 1 hour; consequently, the desorption efficiency of the small-particle-size materials is low, and a rear-end pipeline is blocked. Only the small and medium-particle-size parts in the materials are independently processed, the large-particle-size materials with better particle size uniformity can be processed by using the bubbling bed, the performance advantages of the large-particle-size materials with better particle size uniformity can be utilized, and no rotating equipment is arranged in the bubbling bed, the processing difficulty and the consumption of steel materials are greatly reduced, two processes are matched for desorption, and the total desorption efficiency can be more than 95%.

Moreover, according to the system described in the present disclosure, the control of particle size is achieved, different desorption processes are matched at the same time to find the optimal energy consumption ratio and efficiency ratio; 10% of the particles below 50 μm are separated and enter the second desorption unit for vacuum desorption; particles above 50 μm are desorbed in a bubbling bed, which can achieve efficient desorption of solid amine materials.

Specific Embodiment 2

According to a solid amine carbon dioxide capture project at a tail end of flue gas emissions from a power plant with a scale corresponds to a capture capacity of 10000 t/a, a double-stage Venturi fluidized bed adsorption tower is adopted for an adsorption section, the gas intake volume is 10000 m³/h, the flue gas entering the system described in the specific embodiment 1 is pretreated, liquid water and solid particles in the flue gas are further removed, the cross-sectional flow rate is 1 m/s, the solid amine powder can be adsorbed and saturated in the process of rising along with the flue gas in the bed, the retention time is 20-30 s, the net height of the adsorption tower is 25 m, the temperature of the flue gas and the material is raised from 25° C. to 55° C., and the material adsorption efficiency is more than 90%. After passing through the separation unit 2, 90% of the large-particle-size materials are captured, and the cloth bag collection unit 601 captures 10% of the small-particle-size materials, that is, 9 t/h of large-particle-size materials to be desorbed and 1 t/h of small-particle-size materials to be desorbed. If the system solution described in the specific embodiment 1 is not adopted, the corresponding desorption equipment all are vacuum spiral desorption equipment. Since the maximum material processing capacity of single vacuum desorption equipment is 2-3 t/h, 5 desorption equipment are required in parallel. The investment in the single equipment is about 5 million, and the total investment in the desorption section is 25 million.

By adopting the system of the specific embodiment 1, only one vacuum desorption equipment is required, most materials are desorbed through the bubbling bed, the processing difficulty is low compared with the vacuum desorption equipment, the consumption of steel is low, continuous desorption is easily achieved, and the investment in single equipment is 3 million, which greatly reduces the cost and reduces the floor space by more than half. The bubbling bed adopts a 4-6 stage structure, according to the material flow direction, the first stage is a heating section generally, the air quantity is maximum, the heat exchange tube bundle is maximum, the material can be quickly heated from 70° C. to 110° C.-150° C., so that the material enters an intermediate stage. The intermediate stage is a main section of desorption reaction, the air quantity is minimum, micro-bubbles are formed, the discharged $CO_2$ is favorably desorbed, and the retention time in a proper temperature range is ensured. The last stage is a drying pre-cooling section, the main function is to form self-sealing of the desorption material so as to prevent the material from being oxidized by contacting air at a high temperature. The solid amine material at the outlet of the last stage is connected to an s-shaped cooling channel, the channel adopts a water cooling sleeve structure form, a small amount of $N_2$ is introduced at a turning position as the material spreading air, the material is cooled to be below 80° C. through the double functions of water cooling and air cooling, and can contact air in this case, and then the material is cooled and conveyed to a silo in front of the adsorption tower through a water-cooling screw and pneumatic conveying. The cross-sectional flow rate in the bubbling bed is 0.1-0.3 m/s, the corresponding retention time is 1 h, the desorption temperature is 110-150° C., the desorption efficiency is 95%, and the power consumption equipment in the desorption process is only the booster fan 7 and is saved by more than 70% compared with the power consumption of 5 vacuum desorption equipment connected to a vacuum pump 5A in parallel.

The advantages and disadvantages of the three desorption forms at the same processing capacity are as follows:

|  | Specific embodiment 1: | 5 vacuum spiral equipment | 1 bubbling bed |
| --- | --- | --- | --- |
| Desorption efficiency | 95% | 90% | 80% |
| Steam consumption | 0.3 t/CO₂ | 0.5 t/CO₂-t | 0.3 t/CO₂-t |
| Power consumption | 100 kwh/tCO₂ | 400 kwh/tCO₂ | 130 kwh/tCO₂ |
| Failure rate | Low | Moderate | High, easy to block and requires frequent maintenance |

The above disclosure is only a few specific implementation scenarios of the present disclosure, however, the present disclosure is not limited thereto. Any changes that can be thought of by those skilled in the art should fall within the protection scope of the present disclosure. The above serial numbers of the present disclosure are only for description and do not represent the advantages and disadvantages of the implementation scenarios.

The invention claimed is:

1. A carbon capture system adapted for solid amine materials with various particle sizes, comprising:
    an adsorption assembly, connected to outside environment, and configured to adsorb carbon dioxide from flue gas or air in the outside environment by solid amine with mixed particle sizes to obtain mixed particles after carbon capture;
    a separation unit, connected to an output end of the adsorption assembly, and configured to separate the solid amine with the mixed particle sizes from the mixed particles after carbon capture, and collect separated solid amine;

a first desorption unit, provided at a solid output end of the separation unit, and configured to desorb the carbon dioxide from the separated solid amine by bubbling;
a fine powder recovery assembly, provided at a gas outlet end of the first desorption unit, and configured to screen solid amine escaping from the gas outlet end of the first desorption unit to recover solid amine particles; and
a second desorption unit, connected to an output end of the fine powder recovery assembly, and configured to input the recovered solid amine particles into the second desorption unit for vacuum desorption;
the fine powder recovery assembly, comprising:
an auxiliary separation unit, connected to the gas outlet end of the first desorption unit, and configured to collect the escaped solid amine particles to obtain a to-be-recovered gas;
an air separation and sorting unit, connected to a gas outlet end of the auxiliary separation unit, and configured to air-separate solid amine particles escaping from the gas outlet end of the auxiliary separation unit to recover the solid amine particles; wherein
a solid output end of the air separation and sorting unit is connected to an input end of the second desorption unit and is configured to input the recovered solid amine particles into the second desorption unit for vacuum desorption;
the air separation and sorting unit comprising:
a shell, connected to the gas outlet end of the auxiliary separation unit, and configured to collect a gas to be air-separated containing the escaped solid amine particles and outputted by the gas outlet end of the auxiliary separation unit;
a diversion mechanism, provided at a gas inlet end of the shell, and configured to divert the gas to be air-separated entering the shell to obtain diverted gas containing solid amine particles;
an air separation mechanism, provided at one side of the shell, and configured to air-separate the solid amine particles in the diverted gas; and
a collection mechanism, provided at another side of the shell, arranged opposite to the air separation mechanism, and configured to collect the recovered solid amine particles obtained after air separation by the air separation mechanism and input the recovered solid amine particles into the second desorption unit;
the air separation mechanism comprising:
a gas storage member, connected to an external gas source; and
at least two communicating members, communicated and arranged between the gas storage member and the shell, and configured to output a pulsed airflow into the shell to air-separate the solid amine particles in the diverted gas;
the diversion mechanism comprising:
a heating tube group, provided at a gas inlet end of the shell, and configured to heat the gas to be air-separated entering the shell;
a guide group, provided at the gas inlet end of the shell, positioned at one side of the heating tube group facing a bottom of the shell and configured to guide the gas to be air-separated in a grouping manner; and
a partition plate group, provided between the air separation mechanism and the collection mechanism, and configured to decelerate the gas to be air-separated after grouping guide, so that the air separation mechanism performs air separation and the collection mechanism collects solid amine particles;

the partition plate group comprising:
at least three partition plate members arranged in a vertical stack and spaced apart in both transverse and longitudinal directions; and
a ventilation hole for passing a gas provided between any two transversely adjacent partition plate members; wherein
any two longitudinally adjacent partition plate members are staggered, and a space between the any two longitudinally adjacent partition plate members serves as a communication passage between the air separation mechanism and the collection mechanism;
the collection mechanism comprising:
a connecting member, provided at one side of the shell and arranged opposite to the air separation mechanism;
a collecting pipe, provided between the connecting member and an inner sidewall of the shell; wherein
at least two pipelines communicated with the collecting pipe are provided on the connecting member;
the collecting pipe is arranged at an output end of the air separation mechanism and is configured to collect the recovered solid amine particles; and
an output end of the collecting pipe is connected to the input end of the second desorption unit;
the shell comprising:
a rectangular section, configured to accommodate the diversion mechanism, the air separation mechanism and the collection mechanism; and
an expansion section, connected to the rectangular section, wherein a cross-sectional area of one end of the expansion section away from the rectangular section is more than twice that of the rectangular section.

2. The carbon capture system according to claim 1, wherein the adsorption assembly comprises:
a lower section unit, having a solid input end connected to a solid output end of the first desorption unit, configured to receive solid amine with mixed particle sizes, and having a gas input end connected to the flue gas or air in the outside environment;
a middle section unit, having an input end connected to an output end of the lower section unit, and configured for carbon capture by the solid amine with the mixed particle sizes entering the middle section unit and reducing a reaction temperature during carbon capture by the middle section unit;
an upper section unit, having an input end connected to an output end of the middle section unit, and configured to increase a flow rate for fully mixing the solid amine with mixed particle sizes;
a first Venturi tube, provided between the lower section unit and the middle section unit; and
a second Venturi tube, provided between the middle section unit and the upper section unit.

3. The carbon capture system according to claim 2, wherein the middle section unit comprises:
a middle section shell;
at least one heat exchange tube, provided at an inner sidewall of the middle section shell and configured to reduce a reaction temperature during carbon capture; and
a fin unit, provided at an outer side of the heat exchange tube, and configured to crush an agglomerated material in the solid amine with the mixed particle sizes while increasing a heat exchange area.

4. The carbon capture system according to claim 1, further comprising: a fine powder silo assembly; wherein the fine powder silo assembly is arranged between the separation unit and the second desorption unit and configured to store solid amine particles provided by the separation unit and the fine powder recovery assembly.

5. The carbon capture system according to claim 4, wherein the fine powder silo assembly comprises:
- a cloth bag collecting unit, having an input end connected to a gas output end of the separation unit, and configured to collect solid amine particles escaping from the gas output end of the separation unit;
- a silo, connected to a solid output end of the cloth bag collecting unit, and configured to collect the solid amine particles collected in the cloth bag collecting unit; and
- a vacuum silo, connected to output ends of the silo and the fine powder recovery assembly, and configured to store the solid amine particles provided by the separation unit and the fine powder recovery assembly; wherein the vacuum silo is connected to the second desorption unit and configured to perform vacuum desorption on the solid amine particles provided by the separation unit and the fine powder recovery assembly.

6. The carbon capture system according to claim 5, wherein the cloth bag collecting unit comprises:
- a filter screen layer, configured to collect solid amine particles and discharge gas; and
- a heating member, provided in a middle of the filter screen layer, and configured to dry the solid amine particles.

7. The carbon capture system according to claim 1, wherein the first desorption unit comprises:
- a first desorption shell, wherein a bottom of the first desorption shell close to the ground is provided with an air inlet for introducing fluidized air;
- at least two partition plates, provided in the first desorption shell, and configured to enable solid amine particles to move in the first desorption shell in a bubbling state when fluidized air is introduced;
- a heating tube, provided between any two adjacent partition plates and configured to provide heat during desorption;
- a filter screen, provided in the first desorption shell, and configured to intercept solid amine escaping from the gas outlet end of the first desorption unit; and
- a rapping mechanism, provided on the filter screen, and configured to intermittently rap so as to enable the solid amine attached to the filter screen to fall into the first desorption shell.

8. The carbon capture system according to claim 7, wherein
- an outlet of the solid output end of the separation unit is positioned at a bottom of the first desorption unit; and
- an outlet of an output end of the auxiliary separation unit in the fine powder recovery assembly is positioned at a bottom of the first desorption unit, and the outlet of the output end of the auxiliary separation unit is lower than the outlet of a solid output end of the separation unit.

9. The carbon capture system according to claim 1, further comprising: a booster fan; wherein
- the booster fan is provided between the gas output end of the fine powder recovery assembly and a gas inlet end of the first desorption unit and configured to provide fluidized air for the first desorption unit.

* * * * *